US011370377B2

(12) United States Patent
Schütz et al.

(10) Patent No.: US 11,370,377 B2
(45) Date of Patent: Jun. 28, 2022

(54) VEHICLE STEERING WHEEL AND STEERING WHEEL ASSEMBLY HAVING A VEHICLE STEERING WHEEL OF THIS KIND

(71) Applicant: ZF AUTOMOTIVE SAFETY GERMANY GMBH, Aschaffenburg (DE)

(72) Inventors: Dominik Schütz, Heimbuchenthal (DE); Stefan Bachmann, Heimbuchenthal (DE)

(73) Assignee: ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 0 days.

(21) Appl. No.: 17/053,078

(22) PCT Filed: Apr. 30, 2019

(86) PCT No.: PCT/EP2019/061043
§ 371 (c)(1),
(2) Date: Nov. 5, 2020

(87) PCT Pub. No.: WO2019/223969
PCT Pub. Date: Nov. 28, 2019

(65) Prior Publication Data
US 2021/0229618 A1    Jul. 29, 2021

(30) Foreign Application Priority Data
May 22, 2018    (DE) .................... 10 2018 112 224.1

(51) Int. Cl.
*B60R 21/203*    (2006.01)
*B62D 1/04*    (2006.01)

(52) U.S. Cl.
CPC ............ *B60R 21/2035* (2013.01); *B62D 1/04* (2013.01)

(58) Field of Classification Search
CPC .... B60R 21/2037; B60R 21/2035; B62D 1/04
See application file for complete search history.

(56) References Cited

U.S. PATENT DOCUMENTS

| | | | | |
|---|---|---|---|---|
| 5,775,725 A | * | 7/1998 | Hodac | B60Q 5/003 280/728.2 |
| 6,139,051 A | * | 10/2000 | Fujita | B60Q 5/003 200/61.55 |

(Continued)

FOREIGN PATENT DOCUMENTS

| | | | | |
|---|---|---|---|---|
| EP | 3650289 A1 | * | 5/2020 | ........... B60R 21/203 |
| WO | 2014191291 | | 12/2014 | |

(Continued)

*Primary Examiner* — James A English
*Assistant Examiner* — Scott F. Underwood
(74) *Attorney, Agent, or Firm* — Tarolli, Sundheim, Covell & Tummino LLP (57) ABSTRACT

The invention relates to a vehicle steering wheel (10) having a steering wheel axis (A) about which the vehicle steering wheel (10) can be rotated in the installed state, a steering wheel carcass (12) which has a hub section (14) in the region of the steering wheel axis (A), and a separate latching peg (18) for latching with an airbag module (20), which extends in the axial direction (22) and can be mounted on the steering wheel carcass (12), wherein the hub section (14) of the steering wheel carcass (12) has a rigid carcass hook (24) for latching with the airbag module (20), which extends in the axial direction (22), wherein the latching peg (18) adjoins the carcass hook (24) and partially surrounds same in the circumferential direction. The invention also relates to a steering wheel assembly having a vehicle steering wheel (10) of this kind.

19 Claims, 4 Drawing Sheets

(56) References Cited

U.S. PATENT DOCUMENTS

| | | | | |
|---|---|---|---|---|
| 6,457,379 | B1* | 10/2002 | Mirone | B60Q 5/003 200/61.54 |
| 7,963,548 | B2* | 6/2011 | Oestergren | B60R 21/213 280/728.2 |
| 9,580,034 | B2* | 2/2017 | Saito | B60R 21/21658 |
| 10,099,642 | B2* | 10/2018 | Bachmann | F16B 19/004 |
| 11,027,687 | B2* | 6/2021 | Tessier | B60R 21/2037 |
| 2001/0054810 | A1* | 12/2001 | Sakane | B60R 21/2037 280/728.2 |
| 2003/0024342 | A1* | 2/2003 | Rabagliano | B60R 21/2037 74/552 |
| 2004/0108690 | A1* | 6/2004 | Schutz | B60R 21/2037 280/728.2 |
| 2009/0315304 | A1* | 12/2009 | Hagelgans | B60R 21/2035 280/728.2 |
| 2011/0304126 | A1* | 12/2011 | Matsu | B60R 21/2035 280/728.2 |
| 2012/0292895 | A1 | 11/2012 | Schutz | |
| 2012/0306184 | A1 | 12/2012 | Yamaji et al. | |
| 2016/0031480 | A1* | 2/2016 | Ishii | B60R 21/203 280/731 |
| 2017/0036687 | A1* | 2/2017 | Obayashi | B62D 1/04 |
| 2017/0066398 | A1 | 3/2017 | Bachmann et al. | |
| 2017/0144594 | A1* | 5/2017 | Obayashi | B62D 7/222 |
| 2017/0361801 | A1* | 12/2017 | Banno | B60R 21/2037 |
| 2020/0001816 | A1* | 1/2020 | Ducardonnet | B60R 21/203 |
| 2021/0001915 | A1* | 1/2021 | Ko | B62D 7/222 |
| 2021/0031684 | A1* | 2/2021 | Matsuo | B60Q 5/003 |
| 2021/0261081 | A1* | 8/2021 | Fujimura | B60R 21/21656 |

FOREIGN PATENT DOCUMENTS

| | | | | |
|---|---|---|---|---|
| WO | WO-2018108335 | A1 * | 6/2018 | B60Q 5/003 |
| WO | WO-2019223969 | A1 * | 11/2019 | B62D 1/04 |

* cited by examiner

VEHICLE STEERING WHEEL AND STEERING WHEEL ASSEMBLY HAVING A VEHICLE STEERING WHEEL OF THIS KIND

RELATED APPLICATIONS

This application corresponds to PCT/EP2019/061043, filed Apr. 30, 2019, which claims the benefit of German Application No. 10 2018 112 224.1, filed May 22, 2018, the subject matter of which are incorporated herein by reference in their entirety.

BACKGROUND OF THE INVENTION

The invention relates to a vehicle steering wheel having a steering wheel axis about which the vehicle steering wheel can be rotated in the installed state, a steering wheel carcass having a hub section in the region of the steering wheel axis, as well as a separate latching peg for latching with an airbag module which extends in the axial direction and can be mounted on the steering wheel carcass.

Further, the invention also relates to a steering wheel assembly comprising an airbag module and a vehicle steering wheel of this kind.

It is already known from prior art to design each of vehicle steering wheels and airbag modules as preassembled separate subassemblies and then to connect them to each other so as to form a steering wheel assembly.

Since such steering wheel assemblies are provided within the direct visual range and reach of the driver, high requirements as to measuring tolerances and resulting clearances are made to the connection between the subassemblies. At the same time, when activating the airbag module, high retaining forces have to be transferred to prevent the airbag module from detaching from the vehicle steering wheel.

If the airbag module is moreover intended to be movable in the axial direction relative to the vehicle steering wheel for blowing the horn, the constructional design of the connection is especially challenging, because in that case, apart from high retaining force and minimum clearance between the module and the steering wheel, moreover a smooth and jam-free relative movement has to be ensured.

Finally, the connection is also intended to be quickly and easily releasable so as to enable, for example, quick mounting or dismounting of the airbag module or the steering wheel in the vehicle. For this reason, meanwhile latching connections have been widespread for securing the airbag module to the vehicle steering wheel.

WO 2011/100960 A2 illustrates a generic vehicle steering wheel in which separate latching pegs mountable on the steering wheel carcass are provided which latch with a latching spring of the airbag module. The latching peg is positively coupled to the steering wheel carcass and therefore can reliably transfer the forces occurring upon activation of the airbag module into the steering wheel carcass. The positive connection also has a certain play, however, so that, for minimizing the clearances, fine adjustment of the latching pegs relative to the steering wheel carcass is further possible. Apart from said restraint and fine positioning of the airbag module, the latching peg can additionally take over the axial guiding of the airbag module when the vehicle horn is actuated.

Thus, the latching peg ensures reliable module securing and takes over fine positioning and guiding of the airbag module as well as a robust catching and restraining function. The latching peg has a massive and complicated design, due to the restraining f n, as it must transfer high forces into the steering wheel carcass when the airbag module is activated.

SUMMARY OF THE INVENTION

It is the object of the invention to provide a vehicle steering wheel and a steering wheel assembly comprising a structurally simplified and especially compact connection between an airbag module and a vehicle steering wheel, the connection further providing fine positioning of the airbag module, reliable restraining function and, optionally, axial module guiding.

According to the invention, this object is achieved by a vehicle steering wheel of the type mentioned in the outset in which the hub section of the steering wheel carcass includes a rigid carcass hook for latching with an airbag module which extends in the axial direction, the separate latching peg adjoining the carcass hook and partially surrounding or even completely enclosing the same in the circumferential direction.

Thus, the carcass hook of the steering wheel carcass is configured in this case so that it latches directly with the airbag module, especially with a spring element of the airbag module. This direct latching connection between the airbag module and the steering wheel carcass adopts the catching or restraining function when the airbag module is activated. Accordingly, the steering wheel carcass preferably is a one-piece metal part which forms, for example, a steering wheel hub, at least one spoke and a steering wheel rim, but it may optionally comprise attaching parts which are substantially rigidly con d to, especially tightly screwed or welded with, the metal part. Even the optional attaching parts are preferably made from metal so that carcass hooks formed integrally on the steering wheel carcass are also adapted to easily transfer high restraining forces. The additional latching connection of the airbag module to the separate latching peg then serves only for fine positioning of the airbag module to minimize the clearances. Moreover, the latching peg may optionally adopt an axial guiding of the airbag module to realize a horn function.

Consequently, a function separation takes place in which the carcass hook adopts the catching or restraining function and the latching peg adopts the fine positioning function as well as an optional guiding function. At the same time, the latching peg directly adjoins the carcass hook and partially surrounds the latter. Thus, the different functions are locally concentrated despite a function separation, resulting in little space required. Moreover, the maximum load of the latching peg is considerably reduced so that the latter can be designed to have a simpler and more delicate structure. This will equally contribute to less space required so that, in total, an especially compact design will result for the steering wheel assembly.

Of preference, the latching peg has a slit extending in the axial direction, with the carcass hook extending into and through said slit. A slitted latching peg can be manufactured with little production effort, and the positioning of the carcass hook within the slit of the latching peg then results in an especially space-saving design.

In one embodiment of the vehicle steering wheel, the latching peg extends starting from the hub section in the axial direction to a free end and, at the free end, includes a latching lug having a contact face for a latching spring of the airbag module.

Starting from the hub section, the carcass hook can extend in the axial direction to a free end and can have, at the free end, a latching lug including a stop face for a latching spring of the airbag module.

Accordingly, an axial distance of the stop face from the hub section is preferably larger than an axial distance of the contact face from the hub section. In this way, the latching spring of the airbag module loaded in the axial direction away from the hub section bears against the contact face of the latching peg so that fine positioning of the airbag module is possible via the latching peg. The stop face of the carcass hook is spaced apart, on the other hand, from the latching spring so that larger manufacturing tolerances merely influence the axial play between the latching spring and the stop face rather than visible clearances between the airbag module and the steering wheel. Only when the airbag module is released, can the latching peg possibly no longer absorb the occurring forces so that the latching spring then will contact the stop face and will reliably forward the occurring forces via the carcass hook into the steering wheel carcass.

Furthermore, an axial distance of the stop face from the hub section is preferably smaller than an axial distance of the stop face from a component of the vehicle steering wheel which adjoins the stop face. In this way, with a small axial dimension of the carcass hook, an especially robust and compact latching connection to the airbag module can be realized. Moreover, the shorter carcass hooks entail production advantages when manufacturing the steering wheel carcass.

The component of the vehicle steering wheel axially adjoining the stop face in this case may include, axially adjacent to the stop face, a recess for receiving an airbag module section. The component adjoining the stop face preferably is a steering wheel foam by which the steering wheel carcass is at least partially foam-wrapped.

According to another embodiment of the vehicle steering wheel, a latching lug of the latching peg directly adjoins the carcass hook on opposite sides of the stop face of the carcass hook.

The carcass hook is formed preferably integrally on the hub section of the steering wheel carcass. Especially preferred, the steering wheel carcass comprises a metal body, especially made from die cast metal, which forms a spoke section and a rim section of the steering wheel carcass. Optionally, the steering wheel carcass may further include a mounting plate tightly connected to the metal body, the hub section of the steering wheel carcass being formed by the metal body and/or the mounting plate. The mounting plate may equally be a metal plate, especially a steel plate.

On the other hand, the latching peg preferably is a plastic component which may optionally be designed to be fiber-reinforced.

According to another embodiment of the vehicle steering wheel, plural latching pegs and carcass hooks are provided, with a latching peg being assigned to each carcass hook.

Preferably, in this embodiment, the plural latching hooks are interconnected, especially integrally interconnected, and form a separate prefabricated assembly. Said assembly or the individual latching pegs are, after fine alignment, tightly connected, especially screwed or dipped, to the steering wheel carcass or to a foam-wrapping of the steering wheel carcass. As an alternative, or in addition, the latching pegs can also be foamed and thus fixed to the steering wheel carcass by the foam-wrapping.

For the rest, the invention also relates to a steering wheel assembly comprising an airbag module and an afore-described vehicle steering wheel, the airbag module being latched to the vehicle steering wheel.

Of preference, the airbag module includes a latching spring which forms a latching connection both with the latching peg and with the carcass hook. After latching, the latching spring abuts especially on the latching peg, while it is preferably axially spaced apart from the carcass hook and will contact the same only after the airbag module is released.

BRIEF DESCRIPTION OF THE DRAWINGS

Further features and advantages of the invention will be evident from the following description of preferred embodiments with reference to the drawings, wherein.

DESCRIPTION

Figure 1:
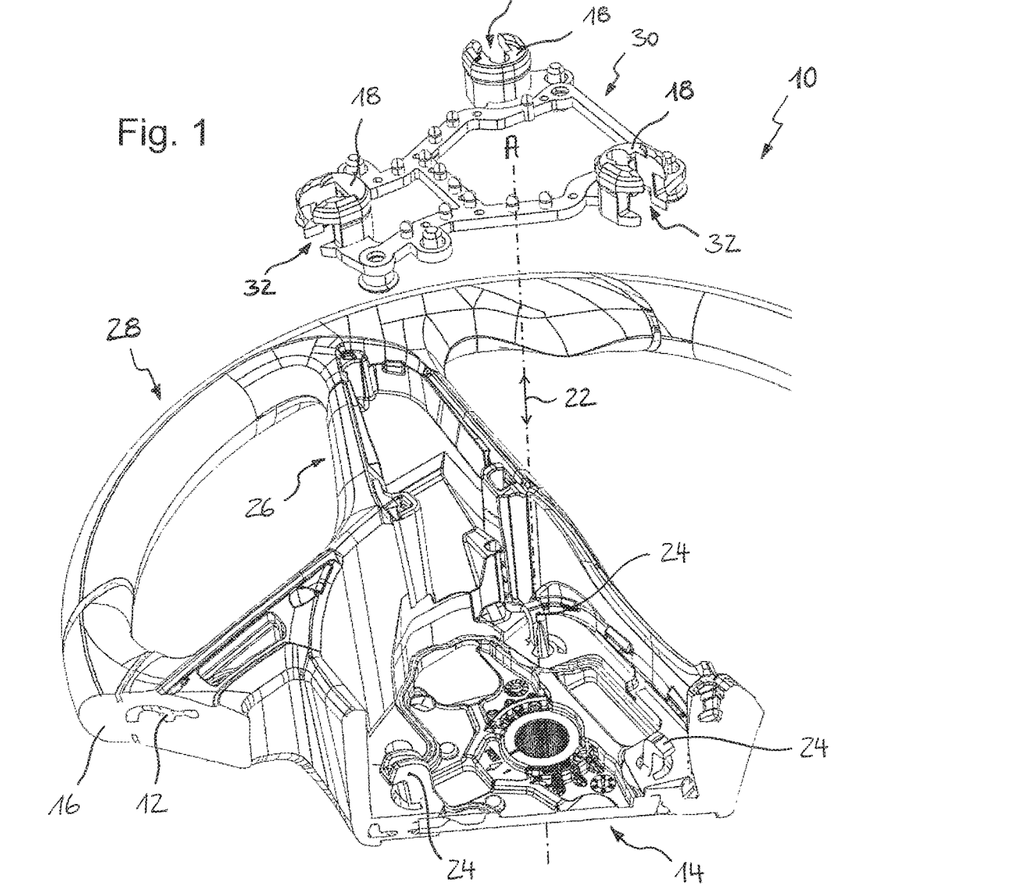
FIG. 1 shows a partly cut perspective exploded view of a vehicle steering wheel according to the invention.
Figure 2:
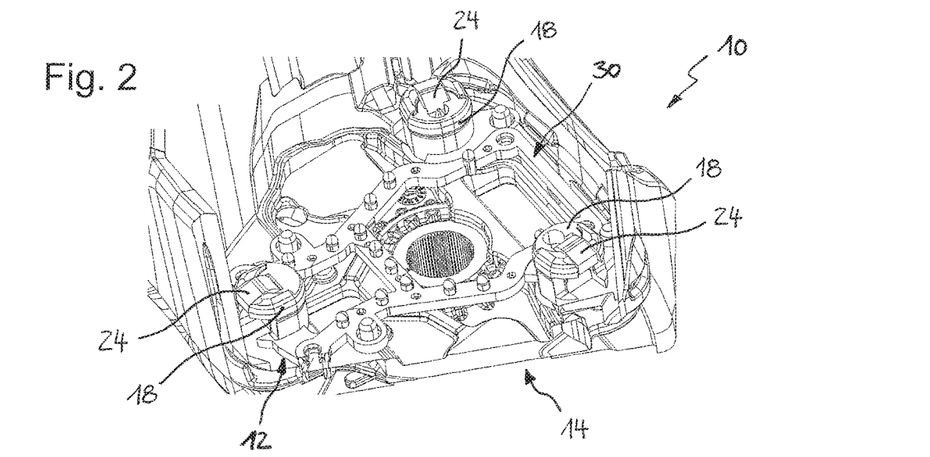
FIG. 2 shows a perspective cutout of the vehicle steering wheel according to FIG. 1 in the assembled state.

FIGS. 1 and 2 illustrate a vehicle steering wheel 10 having a steering wheel axis A about which the vehicle steering wheel 10 is rotatable in the installed state, and a steering wheel carcass 12 which has a hub section 14 in the region of the steering wheel axis A, wherein portions of the steering wheel carcass 12 are foam-wrapped by a steering wheel foam wrapping 16. The vehicle steering wheel 10 moreover comprises a separate latching peg 18 for latching with an airbag module 20 shown in FIG. 5 which extends in the axial direction 22 and can be mounted directly or indirectly via the steering wheel foam 16 on the steering wheel carcass 12. Furthermore, the hub section 14 of the steering wheel carcass 12 includes a rigid carcass hook 24 for latching with the airbag module 20 which equally extends in the axial direction 22.

In the shown embodiment of the vehicle steering wheel 10, the carcass hook 24 is integrally formed on the hub section 14 of the steering wheel carcass 12, the steering wheel carcass 12 comprising a metal body made from die cast metal that forms a spoke section 26 and a rim section 28 of the steering wheel carcass 12. Optionally, the steering wheel carcass 12 moreover may include a mounting plate tightly con d to said metal body, wherein in that case the hub section 14 of the steering wheel carcass 12 is formed by the metal body and/or the optional mounting plate.

The latching peg 18, on the other hand, preferably is a plastic component that has a low weight, can be easily adapted as to its shaping and, as a whole, can be manufactured at low cost.

In the present example embodiment, the vehicle steering wheel 10 includes three latching pegs 18 and three carcass hooks 24, with a latching peg 18 being assigned to each carcass hook 24.

By way of FIG. 1, it is clearly visible that the plural latching pegs 18 are integrally connected to each other and form a prefabricated separate assembly 30. Said assembly can be secured easily and quickly to the steering wheel carcass 12 and/or to the steering wheel foam 16, e.g. by latching, screwing or gluing.

FIG. 2 illustrates the vehicle steering wheel 10 in the assembled state, each latching peg 18 directly adjoining its assigned carcass hook 24 and partially surrounding the same in the circumferential direction.

Concretely speaking, each latching peg 18 includes a slit 32 extending in the axial direction 22 (see FIG. 1) through which the assigned carcass hook 24 extends in the assembled state of the vehicle steering wheel 10 (see FIG. 2). In this way, an extremely compact latching connection is formed between the vehicle steering wheel 10 and the airbag module 20, the carcass hook 24 serving especially for absorbing high axial restraining forces upon release of the airbag module 20 and the latching peg 18 being especially provided for aligning and fine positioning the airbag module 20 relative to the vehicle steering wheel 10 to ensure an as little and uniform clearance as possible during normal driving operation of the vehicle. If a vehicle horn is intended to be blown by axial displacement of the airbag module 20, the latching peg 18 can simultaneously be used as guiding pin which performs axial guiding of the airbag module 20.

Figure 3:
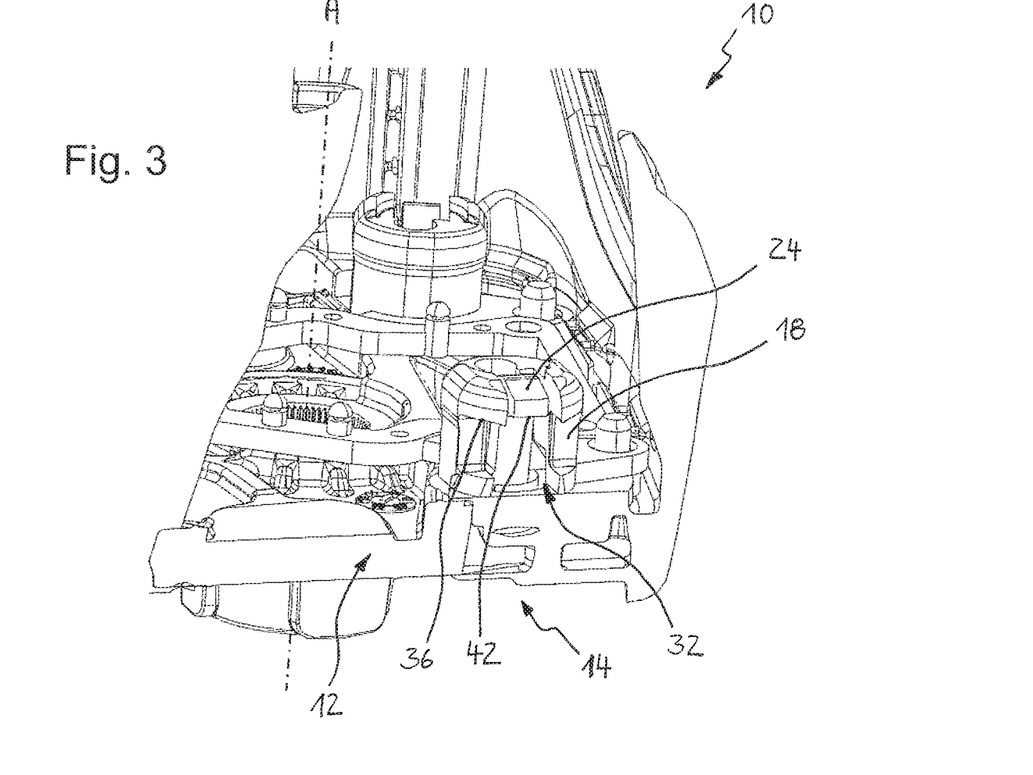
FIG. 3 shows a detail of the vehicle steering wheel according to FIG. 2 in the area of a latching peg and a carcass hook.
Figure 4:
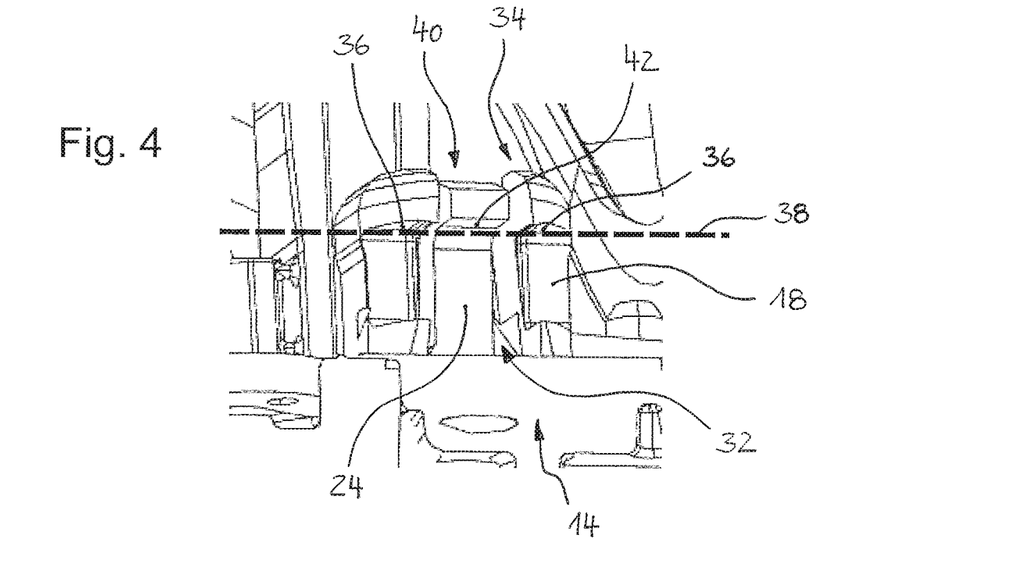
FIG. 4 shows another detail of the vehicle steering wheel according to FIG. 2 in the region of a latching peg and a carcass hook with a schematically indicated latching spring.

FIGS. 3 and 4 illustrate perspective detailed views of the assembled vehicle steering wheel 10 in the region of a carcass hook 24 and the assigned latching peg 18 thereof.

It Is clearly evident that, starting from the hub section 14, the latching peg 18 extends in the axial direction 22 to a free end 34 and, at the free end 34, includes a latching lug having a contact face 36 for a latching spring 38 of the airbag module 20 schematically indicated in FIG. 4. Within the latching peg slit 32, the carcass hook 24 extends starting from the hub section 14 in the axial direction 22 to a free end 40 and, at said free end 40, includes a latching lug having a stop face 42 for the latching spring 38 of the airbag module 20.

In this way, the latching lug of the latching peg 18 directly adjoins the carcass hook 24 on opposite sides of the stop face 42 of the carcass hook 24.

Figure 6:
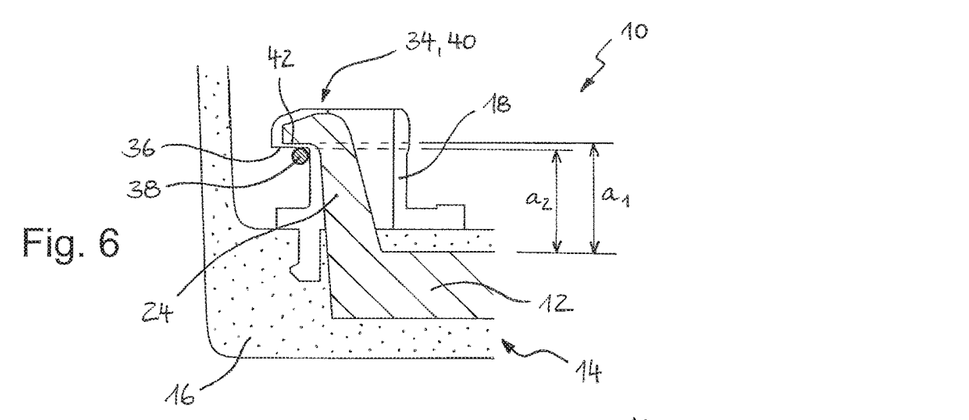
FIG. 6 shows a schematic detail section across the vehicle steering wheel according to FIGS. 1 to 4 comprising a latching spring in the latched state.
Figure 7:
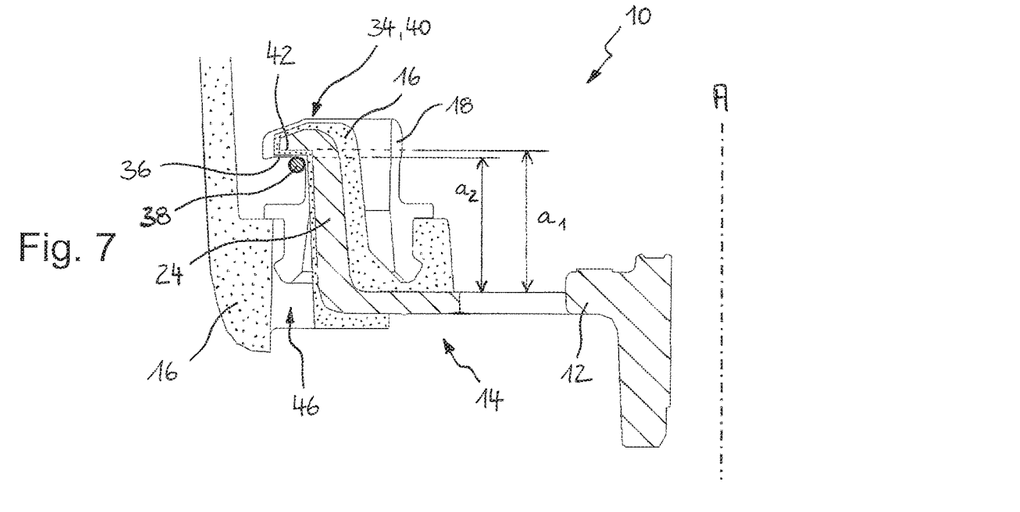
FIG. 7 shows a schematic detail section across a vehicle steering wheel of the invention according to an alternative embodiment.

An axial distance $a_1$ of the stop face 42 from the hub section 14 is larger than an axial distance 82 of the contact face 36 from the hub section 14, as illustrated in FIGS. 6 and 7.

After the airbag module 20 is loaded axially away from the hub section 14 of the steering wheel carcass 12, for example by at least one horn spring, during normal driving operation the latching spring 38 contacts the contact face 36 of the latching peg 18, the contact face 36 being formed by two subareas on opposite sides of the stop face 42.

Only when the separate latching peg 18 is extraordinarily loaded, for example when the airbag module 20 is released, will the latching peg 18 or the bearing thereof yield so that the airbag module 20 including the latching spring 38 moves slightly away from the hub section 14 in the axial direction 22. However, the latching spring 38 then enters into direct contact with the stop face 42 of the carcass hook 24, with the robust carcass hook 24 ensuring reliable restraint of the airbag module 20.

Figure 5:
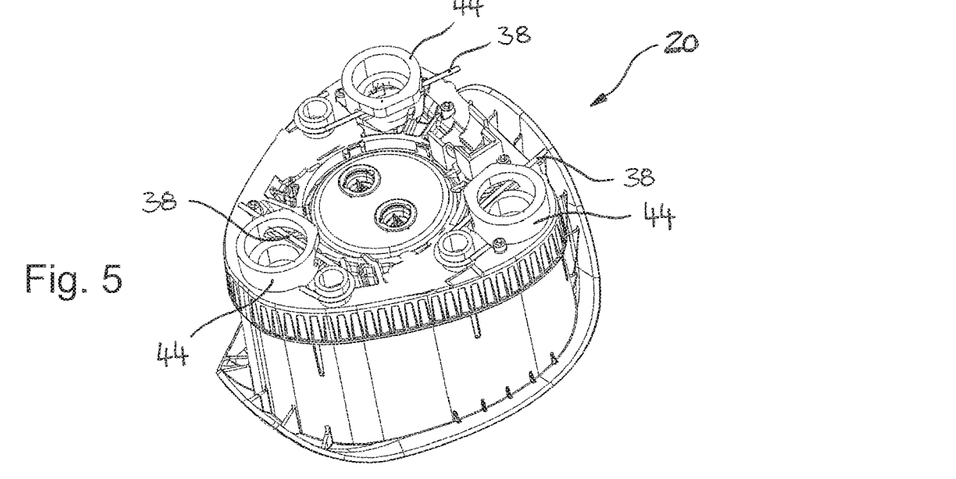
FIG. 5 shows a bottom view of a prefabricated airbag module comprising latching springs for latching to the vehicle steering wheel.

FIG. 5 illustrates a bottom view of the airbag module 20 which is suitable for latching with the vehicle steering wheel 10 shown in FIGS. 1 to 4.

At a module bottom of the airbag module 20, three sleeve-like extensions 44 are provided which extend in the axial direction 22 and to each of which a latching spring 38 is assigned. Said sleeve-like extensions 44 are attached, for mounting the airbag module 20 on the hub section 14 of the vehicle steering wheel 10, onto the latching pegs 18 and the carcass hooks 24 assigned thereto. When sufficient axial mounting pressure is applied, the latching springs 38 deform initially in the radial direction and then snap back behind the latching lugs of the latching pegs 18 and the carcass hooks 24.

After mounting the airbag module 20, the vehicle steering wheel 10 along with the airbag module 20 forms a steering wheel assembly in which the airbag module 20 is latched on the vehicle steering wheel 10, wherein at least one latching spring 38 of the airbag module 20 forms a latching connection both with the latching peg 18 and with the carcass hook 24.

FIG. 6 illustrates a schematic detail section of the vehicle steering wheel 10 in which the carcass hook 24 is not foam-wrapped but axially projects from the steering wheel foam 16 in the region of the hub section 14.

Analogously to FIG. 6, a schematic detail section of the vehicle steering wheel 10 according to an alternative embodiment is shown in FIG. 7. The carcass hook 24 in this case is foam-wrapped, i.e. completely or at least partly covered by steering wheel foam 16. In order to ensure a foam-wrapping especially also in the region of the stop face 42 of the carcass hook 24, a specific tool which after foam-wrapping leaves a foam channel 46 as indicated in FIG. 7 is used for the foam-wrapping step.

In terms of function, said foam-wrapping of the carcass hook 24 is not significant, as the steering wheel foam 16 in the area of the stop face 42 offers no remarkable resistance. Upon release of the airbag module 20, the latching spring 38 in each case bears axially against the stop face 42, wherein the latching spring 38 can cut especially axially into and deform the steering wheel foam 16 so that it enters into direct contact with the stop face 42.

Figure 8:
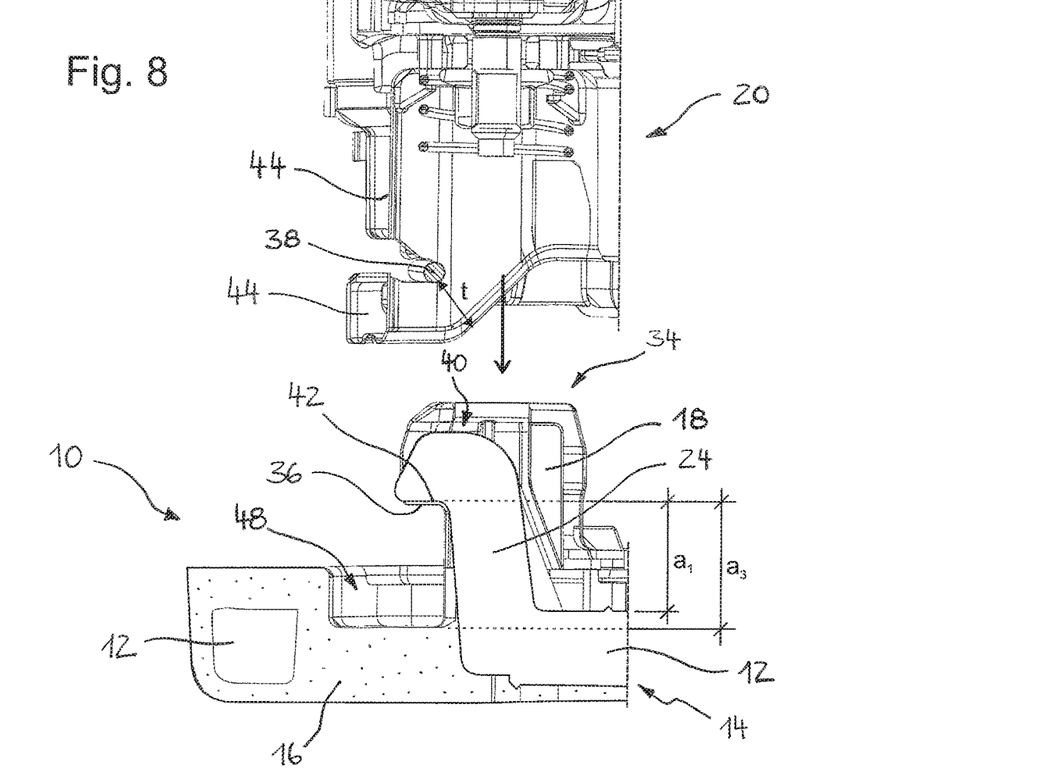
FIG. 8 shows a cutout of a vehicle steering wheel of the invention in the region of a carcass hook according to another embodiment prior to mounting the airbag module.
Figure 9:
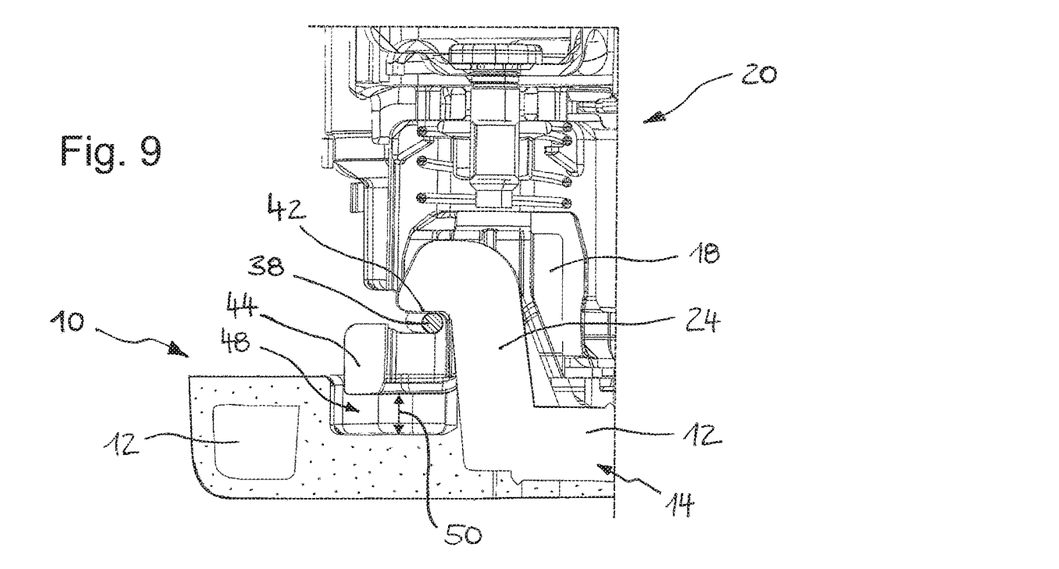
FIG. 9 shows the cutout of the vehicle steering wheel according to FIG. 8 after mounting the airbag module.

Each of FIGS. 8 and 9 shows a cutout of the vehicle steering wheel 10 and the steering wheel assembly according to another embodiment, wherein FIG. 8 illustrates a situation prior to latching the airbag module 20 to the vehicle steering wheel 10 and FIG. 9 illustrates a situation after latching the airbag module 20 on the vehicle steering wheel 10.

With reference to the vehicle steering wheel 10, the present example embodiment includes the special feature that an axial distance $a_1$ of the stop face 42 of the carcass hook 24 from the substantially flat and plate-shaped hub section 14 of the steering wheel carcass 12 is smaller than an axial distance as of the stop face 42 from a component of the vehicle steering wheel 10 axially adjoining the stop face 42. In this way, with a small axial dimension of the carcass hook 24, especially robust and compact latching of the airbag module 20 on the vehicle steering wheel 10 can be realized. A small axial dimension of the carcass hooks does not only contribute to an axially especially compact design of the steering wheel assembly, but also entails production advantages in manufacturing the steering wheel carcass 12.

The component of the vehicle steering wheel 10 adjoining the stop face 42 is, according to FIGS. 8 and 9, the steering wheel foam 16 by which the steering wheel carcass 12 is at least partially foam-wrapped. The steering wheel foam 16 has, axially adjacent to the stop face 42, and thus below the stop face 42 according to FIG. 8, a recess 48 for receiving an airbag module section, said airbag module section being especially a section of the a sleeve-shaped extension 44 of the airbag module 20 (see also FIG. 5). In this region, the steering wheel foam 16 along with the hub section of the steering wheel carcass 12 forms a substantially flat plate-shaped steering wheel base in which the recess is provided, wherein an axial dimension of the recess 48 preferably is 4-8 mm, especially about 6 mm.

As an alternative, or in addition, to the steering wheel foam 16, the component axially adjoining the stop face 42 may also be formed by the assembly 30 and/or the steering wheel carcass 12.

In order to reliably prevent, in the assembled state of the steering wheel assembly according to FIG. 9 upon activation of the airbag module 20, the airbag module 20 from detaching from the vehicle steering wheel 10, the latching spring 38 and the sleeve-shaped extension 44 must be appropriately dimensioned. What is especially critical is a dimension t (see FIG. 8) of the sleeve-shaped extension 44 which must not go below a predeterminable minimum dimension.

The sleeve-shaped extension 44 engages, in the assembled state of the steering wheel assembly, in the recess 48 of the steering wheel foam 16. Furthermore, the recess 48 enables the airbag module 20 to be axially displaced in the direction of the vehicle steering wheel 10 so as to blow a vehicle horn. A maximum horn blowing distance 50 is indicated in FIG. 9 by a double arrow.

The invention claimed is:

1. A vehicle steering wheel comprising
a steering wheel axis (A) about which the vehicle steering wheel (10) can be rotated in an installed state,
a steering wheel carcass (12) which has a hub section (14) in the region of the steering wheel axis (A), as well as
a latching peg (18) for latching with an airbag module (20) extending in the axial direction (22), the latching peg (18) being formed separately from the steering wheel carcass (12) and mountable on the steering wheel carcass (12),
wherein the hub section (14) of the steering wheel carcass (12) includes a rigid carcass hook (24) for latching with the airbag module (20) which extends in the axial direction (22),
wherein the latching peg (18) includes a slit (32) extending in the axial direction (22), the carcass hook (24) extending into the slit (32) such that the latching peg (18) at least partially surrounds the carcass hook (24) in the circumferential direction.

2. The vehicle steering wheel according to claim 1, wherein the latching peg (18) extends starting from the hub section (14) in the axial direction (22) to a free end (34) and, at the free end (34), includes a latching lug having a contact face (36) for a latching spring (38) of the airbag module (20).

3. The vehicle steering wheel according to claim 2, wherein the carcass hook (24) extends starting from the hub section (14) in the axial direction (22) to a free end (40) and, at the free end (40), includes a latching lug having a stop face (42) for a latching spring (38) of the airbag module (20), an axial distance ($a_1$) of the stop face (42) from the hub section (14) being larger than an axial distance ($a_2$) of the contact face (36) from the hub section (14).

4. The vehicle steering wheel according to claim 2, wherein the carcass hook (24) extends starting from the hub section (14) in the axial direction (22) to a free end (40) and, at the free end (40), includes a latching lug having a stop face (42) for a latching spring (38) of the airbag module (20), the latching lug of the latching peg (18) directly adjoining the carcass hook (24) on opposite sides of the stop face (42) of the carcass hook (24).

5. The vehicle steering wheel according to claim 1, wherein the carcass hook (24) extends starting from the hub section (14) in the axial direction (22) to a free end (40) and, at the free end (40), includes a latching lug having a stop face (42) for a latching spring (38) of the airbag module (20).

6. The vehicle steering wheel according to claim 5, wherein an axial distance ($a_1$) of the stop face (42) from the hub section (14) is smaller than an axial distance ($a_3$) of the stop face (42) from a component of the vehicle steering wheel (10) axially adjoining the stop face (42).

7. The vehicle steering wheel according to claim 6, wherein the component of the vehicle steering wheel (10) axially adjoining the stop face (42) includes, axially adjoining the stop face (42), a recess (48) for receiving an airbag module section.

8. The vehicle steering wheel according to claim 1, wherein the carcass hook (24) is formed integrally on the hub section (14) of the steering wheel carcass (12).

9. The vehicle steering wheel according to claim 1, wherein plural latching pegs (18) and carcass hooks (24) are provided, each latching peg (18) having an associated carcass hook (24).

10. The vehicle steering wheel according to claim 9, wherein the plural latching pegs (18) are interconnected and form an assembly (30).

11. A steering wheel assembly comprising an airbag module (20) and a vehicle steering wheel (10) according to claim 1, wherein the airbag module (20) is latched with the vehicle steering wheel (10).

12. The steering wheel assembly according to claim 11, wherein the airbag module (20) includes a latching spring (38) which forms a latching connection both with the latching peg (18) and with the carcass hook (24).

13. The vehicle steering wheel according to claim 1, wherein the latching peg (18) includes a latching lug having a contact face (36), the slit (32) separating a first portion of the contact face (36) from a second portion of the contact face (36), each of the first and second portions engaging a latching spring (38) of the airbag module (20).

14. The vehicle steering wheel according to claim 13, wherein the carcass hook (24) includes a latching lug having a stop face (42) for engaging the latching spring (38) of the airbag module (20), the stop face (42) being positioned between the first and second portions of the contact face (36).

15. A vehicle steering wheel, comprising:
a steering wheel axis (A) about which the vehicle steering wheel (10) is rotated in an installed state;
a steering wheel carcass (12) having a hub section (14) in a region of the steering wheel axis (A), the hub section (14) including a rigid carcass hook (24) for latching with an airbag module (20), the carcass hook (24) extending from the hub section (14) in an axial direction (22) to a free end (40), a latching lug of the carcass hook (24) being at the free end (40) and having a stop face (42) for directly engaging a latching spring (38) of the airbag module (20); and
a latching peg (18) for latching with the airbag module (20), the latching peg (18) extending in the axial direction (22), the latching peg (18) being formed separately from both the steering wheel carcass (12) and the carcass hook (24) and being mountable on the steering wheel carcass (12), the latching peg (18) being joined to the carcass hook (24) and at least partially surrounding the carcass hook (24) in the circumferential direction.

16. The vehicle steering wheel according to claim 15, wherein the latching peg (18) extends from the hub section (14) in the axial direction (22) to a free end (34) and, at the free end (34), includes a latching lug having a contact face (36) for directly engaging the latching spring (38) of the airbag module (20).

17. A vehicle steering wheel, comprising:
    a steering wheel axis (A) about which the vehicle steering wheel (10) is rotated in an installed state;
    a steering wheel carcass (12) having a hub section (14) in a region of the steering wheel axis (A), the hub section (14) including a plurality of rigid carcass hooks (24) for latching with an airbag module (20), the carcass hooks (24) extending in the axial direction (22); and
    an assembly (30) formed separately from the steering wheel carcass (12) and formed of a plurality of interconnected and integrally formed latching pegs (18), the assembly (30) of the integrally formed latching pegs (18) being mountable on the steering wheel carcass (12) in one-piece, the latching pegs (18) extending in the axial direction (22) and being configured to latch with the airbag module (20), each latching peg (18) being separate from and joined to an associated carcass hook (24) such that each latching peg (18) at least partially surrounds the associated carcass hook (24) in the circumferential direction.

18. The vehicle steering wheel according to claim 17, wherein each latching peg (18) extends from the hub section (14) in the axial direction (22) to a free end (34) and, at the free end (34), includes a latching lug having a contact face (36) for directly engaging a latching spring (38) of the airbag module (20).

19. The vehicle steering wheel according to claim 17, wherein each carcass hook (24) extends from the hub section (14) in the axial direction (22) to a free end (40) and, at the free end (40), includes a latching lug having a stop face (42) for directly engaging a latching spring (38) of the airbag module (20).

\* \* \* \* \*